US010638333B2

United States Patent
Liu et al.

(10) Patent No.: US 10,638,333 B2
(45) Date of Patent: Apr. 28, 2020

(54) METHOD, BASE STATION, AND SYSTEM FOR SENDING RRC SIGNALING

(71) Applicant: Huawei Technologies Co., Ltd., Shenzhen (CN)

(72) Inventors: Wenji Liu, Shanghai (CN); Qufang Huang, Shanghai (CN); Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 14/754,278

(22) Filed: Jun. 29, 2015

(65) Prior Publication Data
US 2015/0304860 A1    Oct. 22, 2015

Related U.S. Application Data

(63) Continuation of application No. PCT/CN2013/089426, filed on Dec. 13, 2013.

(30) Foreign Application Priority Data

Dec. 31, 2012    (CN) .......................... 2012 1 0593797

(51) Int. Cl.
*H04W 16/32*    (2009.01)
*H04W 28/08*    (2009.01)
(Continued)

(52) U.S. Cl.
CPC ........... *H04W 16/32* (2013.01); *H04W 28/08* (2013.01); *H04L 5/001* (2013.01); *H04W 76/20* (2018.02)

(58) Field of Classification Search
None
See application file for complete search history.

(56) References Cited

U.S. PATENT DOCUMENTS

| 2011/0158089 A1* | 6/2011 | Sambhwani | H04W 36/22 |
| | | | 370/230 |
| 2011/0268007 A1* | 11/2011 | Barany | H04B 7/024 |
| | | | 370/312 |

(Continued)

FOREIGN PATENT DOCUMENTS

| CN | 101610555 A | 12/2009 |
| CN | 101984720 A | 3/2011 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.4.0, pp. 1-208, 3rd Generation Partnership Project, Valbonne, France (Dec. 2012).

(Continued)

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

Embodiments of the present disclosure disclose a method, a base station, and a system for sending RRC signaling, and in the method for sending RRC signaling provided in the embodiments of the present disclosure, a pico base station and a macro base station participate in configuration and generation of an RRC reconfiguration message; the pico base station establishes only one RRC entity that is used to generate a configuration parameter or an RRC entity; the RRC reconfiguration message cooperatively generated by the pico base station and the macro base station is uniformly sent by the macro base station to a user equipment. Therefore, the user equipment UE can support, only by establishing an SRB corresponding to the macro base station, an RRC (Continued)

reconfiguration message sent by the pico base station, thereby lowering design complexity and costs.

9 Claims, 5 Drawing Sheets

(51) Int. Cl.
*H04W 76/02* (2009.01)
*H04W 76/20* (2018.01)
*H04L 5/00* (2006.01)

(56) References Cited

U.S. PATENT DOCUMENTS

| | | | |
|---|---|---|---|
| 2011/0300807 A1* | 12/2011 | Kwun | H04W 24/10 455/63.1 |
| 2012/0115541 A1* | 5/2012 | Suga | H04W 36/22 455/525 |
| 2012/0142361 A1 | 6/2012 | Zhao et al. | |
| 2012/0201228 A1 | 8/2012 | Wu | |
| 2013/0183971 A1* | 7/2013 | Tamaki | H04W 36/0061 455/436 |
| 2013/0250881 A1* | 9/2013 | Liao | H04W 36/08 370/329 |
| 2014/0056243 A1* | 2/2014 | Pelletier | H04W 74/04 370/329 |
| 2014/0092785 A1* | 4/2014 | Song | H04L 1/00 370/280 |
| 2014/0355562 A1* | 12/2014 | Gao | H04W 76/025 370/331 |
| 2015/0124748 A1 | 5/2015 | Park et al. | |
| 2015/0139192 A1* | 5/2015 | Zhang | H04W 36/04 370/331 |
| 2015/0181593 A1* | 6/2015 | Kim | H04W 52/0216 370/329 |
| 2015/0223178 A1 | 8/2015 | Pietraski et al. | |
| 2015/0230236 A1* | 8/2015 | Zeng | H04L 41/0806 370/329 |
| 2015/0244429 A1* | 8/2015 | Zhang | H04B 7/024 370/329 |
| 2015/0351139 A1* | 12/2015 | Zhang | H04W 52/0251 370/329 |
| 2016/0150502 A1* | 5/2016 | Sebire | H04W 72/04 455/450 |
| 2016/0338138 A1 | 11/2016 | Pelletier et al. | |

FOREIGN PATENT DOCUMENTS

| | | |
|---|---|---|
| CN | 102026324 A | 4/2011 |
| CN | 102769849 A | 11/2012 |
| CN | 103338518 A | 10/2013 |
| EP | 2534899 A1 | 12/2012 |
| EP | 2888906 A1 | 7/2015 |
| EP | 2908570 A1 | 8/2015 |
| EP | 3064028 A1 | 9/2016 |
| EP | 3474626 A1 | 4/2019 |
| WO | WO 2011142544 A2 | 11/2011 |
| WO | WO 2014036734 A1 * | 3/2014 ......... H04L 41/0806 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.2.0, pp. 1-340, 3rd Generation Partnership Project, Valbonne, France (Dec. 2012).

Ishii et al., "A Novel Architecture for LTE-B; C-plane/ U-plane Split and Phantom Cell Concept," GC'12 Workshop: International Workshop on Emerging Technologies for LTE-Advanced and Beyond 4G, pp. 624-630, Institute of Electrical and Electronics Engineers, New York, New York (Dec. 3-7, 2012).

"Summary of email discussion [81bis#18][LTE/SCE-HL] CP protocol and architecture alternatives," 3GPP TSG-RAN WG2 #82, R2-131673, Fukuoka, Japan, pp. 1-36, 3rd Generation Partnership Project—Valbonne, France (May 20-24, 2013).

* cited by examiner

METHOD, BASE STATION, AND SYSTEM FOR SENDING RRC SIGNALING

CROSS-REFERENCE TO RELATED APPLICATIONS

This application is a continuation of International Patent Application No. PCT/CN2013/089426, filed on Dec. 13, 2013, which claims priority to Chinese Patent Application No. 201210593797.1, filed on Dec. 31, 2012, both of which are hereby incorporated by reference in their entireties.

TECHNICAL FIELD

The present disclosure relates to the field of communications technologies, and in particular, to a method, a base station, and a system for sending RRC signaling.

BACKGROUND

Release 10 of a Long Term Evolution (LTE for short) technology, that is, an R10 system can support a Carrier Aggregation (CA for short) technology, that is, multiple Component Carriers (CC for short) can be allocated to one user equipment (UE for short) to support a higher data transmission rate. A UE that supports CA may have one Primary Cell (PCell for short) and one or more Secondary Cells (SCell for short).

A future release of LTE, such as R12, may support LTE-Advanced Multi-Stream Aggregation (MSA for short). This is a new technology that is used to increase a cell edge rate and is proposed at a 3GPP LTE-Advanced future evolution conference. MSA may be applied to inter-base station coordination of a macro cell to increase an edge user rate, or may be applied in a heterogeneous networking scenario of a large cell and a small cell to increase a peak rate for a user and simplify mobility management, thereby creating consistent service experience for the user. In future development of mobile broadband, user experience is the biggest concern of operators. In a mobile communications coverage area, users in different geographical locations should enjoy a mobile service of same quality. However, in a cellular communications system, system performance at an inter-cell edge is often one of the biggest challenges during design of a mobile communications system. If LTE, a mainstream technology for future wireless communications, and an evolution technology of LTE cannot improve user experience at a cell edge location, wide application of LTE may face a great challenge. A core idea of MSA multi-stream aggregation is that with a dynamic system adjustment, a user can always receive downlink data from a cell or a cell group with a best signal and perform data stream aggregation. In a similar manner used in an uplink direction, the user always transmits uplink data to the cell or the cell group with the best signal and performs data stream aggregation on a network side.

For a UE that supports CA, MSA may be considered as cell aggregation of different base stations (Evolved NodeB, eNB for short). In a release earlier than R11, both a PCell and a Scell of a UE belong to a same eNB. However, for a UE in MSA, a PCell and a SCell may belong to different eNBs.

For a scenario in which a Macro eNB and a Pico eNB are in same coverage, a UE may receive both a signal from the Macro eNB and a signal from the Pico eNB. The Macro eNB implements a control plane function of the UE, including a mobility management function of the UE. The Pico eNB is mainly used to carry an indoor data service with low mobility, to implement a user plane function. That is, a user plane and a control plane of an air interface are in a separated manner, that is, C/U separation. A link from the Pico eNB to the UE is only responsible for data transmission on the user plane, and control plane signaling from the Pico eNB to the UE is transmitted over a link from the Macro eNB to the UE. A connection between the Pico eNB and the Macro eNB is a wired connection and is similar to an X2 interface. Once the UE and the Macro eNB establish an RRC connection, the Macro eNB transmits RRC configuration information required by the Pico eNB to the Pico eNB by using a newly-defined interface message. Related configuration information may be sent to the Pico eNB when the UE and the Macro eNB establish the RRC connection.

C/U separation may also be separation in broad sense. Referring to FIG. 1, FIG. 1 is a protocol stack architecture in the prior art. A Pico eNB establishes, for a signaling radio bearer (SRB for short), a protocol entity from a physical (Phy) layer to a Packet Data Convergence Protocol (PDCP) layer. Two sets of SRBs are established on a UE side and are respectively corresponding to a Macro eNB and the Pico eNB. In this protocol architecture, the Macro eNB may directly send generated RRC signaling to the UE, as shown by a dashed line A in FIG. 1; the Pico eNB may also transport RRC signaling to the UE, but the RRC signaling is generated by the Macro eNB, as shown by a dashed line B in FIG. 1.

Referring to FIG. 2, FIG. 2 is another protocol stack architecture in the prior art. A Pico eNB establishes, for an SRB, a protocol entity from Phy to RRC, but the Pico eNB is only responsible for configuration at bottom layers, that is, configuration of Phy, MAC, and RLC of the Pico eNB is completed by RRC of the Pico eNB. Two sets of SRBs are established on a UE side and are respectively corresponding to a Macro eNB and the Pico eNB. In this protocol architecture, the Macro eNB may send generated RRC signaling to the UE, and the Pico eNB may also generate RRC signaling and send the RRC signaling to the UE.

During a process of studying and practicing this method, the inventor of the present disclosure finds that, to support MSA, two sets of SRBs need to be established on the user equipment side to support RRC signaling from the Macro eNB and that from the Pico eNB, thereby increasing design complexity and costs.

SUMMARY

Embodiments of the present disclosure provide a method, a base station, and a system for sending RRC signaling, so that a user equipment can support, only by establishing an SRB corresponding to a macro base station, RRC signaling sent by a Pico eNB, thereby lowering system design complexity and costs.

According to a first aspect, an embodiment of the present disclosure provides a method for sending RRC signaling, including:

participating, by a macro base station and a pico base station, in generation of an RRC reconfiguration message, sending, by the macro base station, the RRC reconfiguration message to the UE, where the pico base station establishes only one RRC entity that is used to generate a configuration parameter or generate an RRC reconfiguration message.

In a first possible implementation manner, with reference to the first aspect, the participating, by a macro base station and a pico base station, in generation of an RRC reconfiguration message specifically includes:

receiving, by the pico base station, an X2 interface message sent by the macro base station, where the X2 interface message includes a message for requesting to add/modify a cell, or a message for requesting to add/modify a radio bearer RB;

responding, by the pico base station, to the received X2 interface message, and generating a configuration parameter; and sending the generated configuration parameter to the macro base station, so that the macro base station generates an RRC reconfiguration message by using the received configuration parameter, and sends the generated RRC reconfiguration message to the UE.

In a second possible implementation manner, with reference to the first aspect, the participating, by a macro base station and a pico base station, in generation of an RRC reconfiguration message specifically includes: receiving, by the pico base station, an X2 interface message sent by the macro base station, where the X2 interface message includes a message for requesting to add/modify a cell, or a message for requesting to add/modify a radio bearer RB;

responding, by the pico base station, to the received X2 interface message, and generating a configuration parameter; and encapsulating the generated configuration parameter into a container and sending the container to the macro base station, so that the macro base station generates an RRC reconfiguration message after receiving the container, and sends the RRC reconfiguration message to the UE, where the RRC reconfiguration message includes the container.

In a third possible implementation manner, with reference to the first aspect, the participating, by a macro base station and a pico base station, in generation of an RRC reconfiguration message specifically includes:

receiving, by the pico base station, an X2 interface message and a configuration parameter that are sent by the macro base station, where the X2 interface message includes a message for requesting to add/modify a cell, or a message for requesting to add/modify a radio bearer RB; and generating, by the pico base station according to the received X2 interface message and the received configuration parameter, an RRC reconfiguration message, and sending the generated RRC reconfiguration message to the macro base station, so that the macro base station sends the received RRC reconfiguration message to the UE.

In a fourth possible implementation manner, with reference to the first aspect, the participating, by a macro base station and a pico base station, in generation of an RRC reconfiguration message specifically includes:

sending, by the macro base station, an X2 interface message to the pico base station, where the X2 interface message includes a message for requesting to add/modify a cell, or a message for requesting to add/modify a radio bearer RB, so that the pico base station responds to the received X2 interface message, generates a configuration parameter, and sends the generated configuration parameter to the macro base station; and generating, by the macro base station according to the received configuration parameter, an RRC reconfiguration message, and sending the RRC reconfiguration message to the UE.

In a fifth possible implementation manner, with reference to the first aspect, the participating, by a macro base station and a pico base station, in generation of an RRC reconfiguration message specifically includes: sending, by the macro base station, an X2 interface message to the pico base station, where the X2 interface message includes a message for requesting to add/modify a cell, or a message for requesting to add/modify a radio bearer RB, so that the pico base station responds to the received X2 interface message, generates a configuration parameter, encapsulates the generated configuration parameter into a container, and sends the container to the macro base station; and generating, by the macro base station after receiving the container, an RRC reconfiguration message, and sending the generated RRC reconfiguration message to the UE, where the RRC reconfiguration message includes the container.

In a sixth possible implementation manner, with reference to the first aspect, the participating, by a macro base station and a pico base station, in generation of an RRC reconfiguration message specifically includes: sending, by the macro base station, an X2 interface message and a configuration parameter to the pico base station, where the X2 interface message includes a message for requesting to add/modify a cell, or a message for requesting to add/modify a radio bearer RB, so that the pico base station generates an RRC reconfiguration message according to the received X2 interface message and the received configuration parameter, and sends the RRC reconfiguration message to the macro base station; and sending, by the macro base station, the received RRC reconfiguration message to the UE.

According to a second aspect, an embodiment of the present disclosure further provides a base station, where the base station includes a first receiving module, a first generating module, and a first sending module, where:

the first receiving module is configured to receive an X2 interface message sent by a macro base station, where the X2 interface message includes a message for requesting to add/modify a cell, or a message for requesting to add/modify a radio bearer RB;

the first generating module is configured to respond to the X2 interface message received by the first receiving module, and generate a configuration parameter; and the first sending module is configured to send the configuration parameter generated by the first generating module to the macro base station, so that the macro base station generates an RRC reconfiguration message by using the received configuration parameter, and sends the generated RRC reconfiguration message to a UE;

or, the first receiving module is configured to receive an X2 interface message sent by a macro base station, where the X2 interface message includes a message for requesting to add/modify a cell, or a message for requesting to add/modify a radio bearer RB;

the first generating module is configured to respond to the X2 interface message received by the first receiving module, and generate a configuration parameter; and the first sending module is configured to encapsulate the configuration parameter generated by the first generating module into a container, and send the container to the macro base station, so that the macro base station generates an RRC reconfiguration message after receiving the container, and sends the RRC reconfiguration message to the UE, where the RRC reconfiguration message includes the container;

or, the first receiving module is configured to receive an X2 interface message and a configuration parameter that are sent by a macro base station, where the X2 interface message includes a message for requesting to add/modify a cell, or a message for requesting to add/modify a radio bearer RB;

the first generating module is configured to generate an RRC reconfiguration message according to the X2 interface message and the configuration parameter that are received by the first receiving module; and the first sending module is configured to send the RRC reconfiguration message generated by the first generating module to the macro base station, so that the macro base station sends the received RRC reconfiguration message to a UE.

According to a third aspect, an embodiment of the present disclosure further provides another base station, where the base station includes a second sending module, a second generating module, and a third sending module, where:

the second sending module is configured to send an X2 interface message to a pico base station, where the X2 interface message includes a message for requesting to add/modify a cell, or a message for requesting to add/modify a radio bearer RB, so that the pico base station responds to the received X2 interface message, generates a configuration parameter, and sends the generated configuration parameter to the second generating module;

the second generating module is configured to generate an RRC reconfiguration message according to the received configuration parameter; and the third sending module is configured to send the RRC reconfiguration message generated by the second generating module to a UE;

or, the second sending module is configured to send an X2 interface message to a pico base station, where the X2 interface message includes a message for requesting to add/modify a cell, or a message for requesting to add/modify a radio bearer RB, so that the pico base station responds to the received X2 interface message, generates a configuration parameter, encapsulates the generated configuration parameter into a container, and sends the container to the second generating module;

the second generating module is configured to respond to the received container and generate an RRC reconfiguration message; and the third sending module is configured to send the RRC reconfiguration message generated by the second generating module to a UE, where the RRC reconfiguration message includes the container;

or, the base station includes a fourth sending module and a fifth sending module, where the fourth sending module is configured to send an X2 interface message and a configuration parameter to a pico base station, where the X2 interface message includes a message for requesting to add/modify a cell, or a message for requesting to add/modify a radio bearer RB, so that the pico base station generates an RRC reconfiguration message according to the received X2 interface message and the received configuration parameter, and sends the generated RRC reconfiguration message to the fifth sending module; and the fifth sending module is configured to send the received RRC reconfiguration message to a UE.

According to a fourth aspect, an embodiment of the present disclosure further provides a system for sending RRC signaling, including a macro base station and a pico base station, where:

the macro base station and the pico base station are configured to participate in generation of an RRC reconfiguration message; and the macro base station is further configured to send the generated RRC reconfiguration message to the UE; where the pico base station establishes only one RRC entity that is used to generate a configuration parameter or generate an RRC reconfiguration message.

It can be learned from the foregoing that, in a method for sending RRC signaling provided in the embodiments of the present disclosure, a pico base station and a macro base station participate in configuration and generation of an RRC reconfiguration message, and the pico base station establishes only one RRC entity that is used to generate a configuration parameter or an reconfiguration message; and the RRC reconfiguration message cooperatively generated by the pico base station and the macro base station is uniformly sent by the macro base station to a user equipment. Therefore, the user equipment UE can support, only by establishing an SRB corresponding to the macro base station, an RRC reconfiguration message sent by the pico base station, thereby lowering design complexity and costs.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide a method, a base station, and a system for sending RRC signaling, so that a user equipment can support, only by establishing an SRB corresponding to a macro base station, RRC signaling sent by a Pico eNB, thereby lowering design complexity and costs.

To make a person skilled in the art understand the technical solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a method for sending RRC signaling, where the method includes the following step:

A macro base station and a pico base station participate in generation of an RRC reconfiguration message according to a measurement report sent by a user equipment UE, and the macro base station sends the RRC reconfiguration message to the UE, where the pico base station establishes only one RRC entity that is used to generate a configuration parameter or generate an RRC reconfiguration message.

It should be noted that, the method for sending RRC signaling provided in this embodiment of the present disclosure may be used in a multi-stream aggregation MSA system.

The measurement report sent by the user equipment UE includes a signal feature of a neighboring cell.

In this embodiment of the present disclosure, the pico base station may establish only one RRC entity that is used to generate a configuration parameter or generate an RRC reconfiguration message.

It can be learned from the foregoing that, in a method for sending RRC signaling provided in this embodiment of the present disclosure, a pico base station establishes only one RRC entity, a macro base station and the pico base station cooperatively generate an RRC reconfiguration message, and finally the macro base station sends the RRC reconfiguration message to a user equipment UE. Therefore, the user equipment UE can support, only by establishing an SRB corresponding to the macro base station, an RRC reconfiguration message sent by the pico base station, thereby lowering system design complexity and costs.

Figure 1:
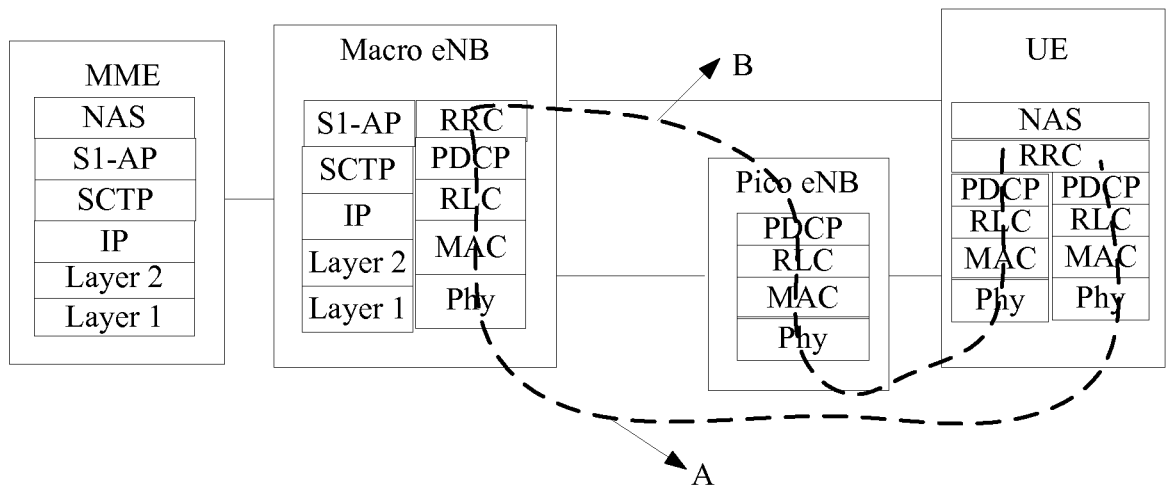
FIG. 1 is a schematic diagram of an RRC protocol stack architecture in the prior art.
Figure 2:
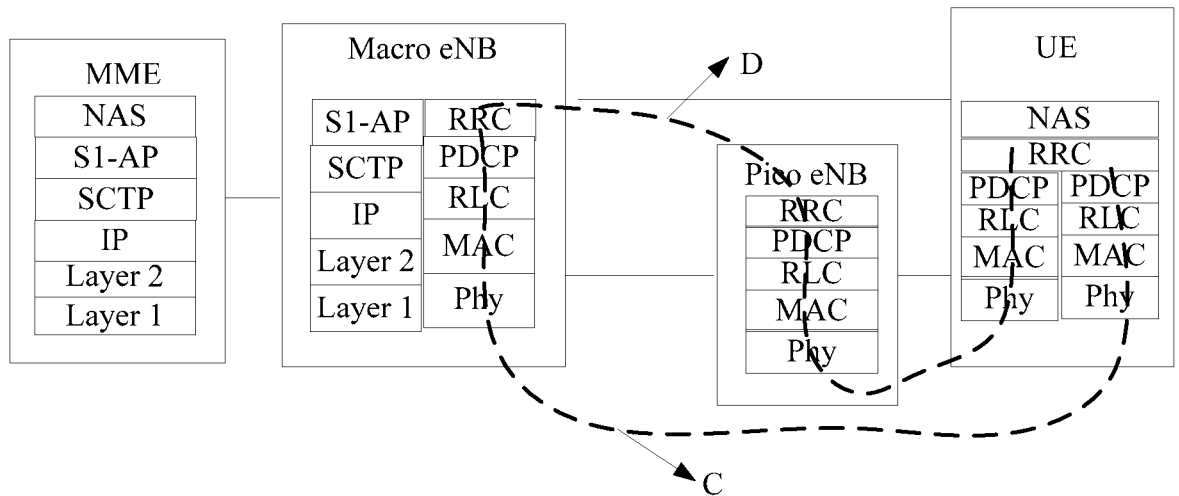
FIG. 2 is a schematic diagram of another RRC protocol stack architecture in the prior art.
Figure 3:
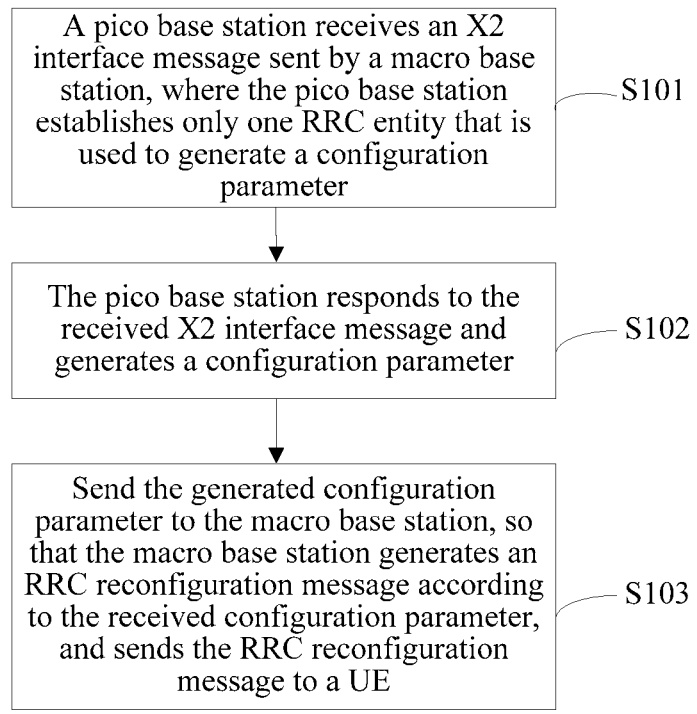
FIG. 3 is a flowchart of a method for sending RRC signaling according to an embodiment of the present disclosure.

An embodiment of the present disclosure further provides another method for sending RRC signaling, and as shown in FIG. 3, the method includes the following steps:

S101: A pico base station receives an X2 interface message sent by a macro base station, where the pico base station establishes only one RRC entity that is used to generate a configuration parameter.

The X2 interface message includes a message for requesting to add/modify a cell, or a message for requesting to add/modify a radio bearer RB.

S102: The pico base station responds to the received X2 interface message and generates a configuration parameter.

S103: Send the generated configuration parameter to the macro base station, so that the macro base station generates an RRC reconfiguration message according to the received configuration parameter, and sends the RRC reconfiguration message to a UE.

It should be noted that, the method for sending RRC signaling provided in this embodiment of the present disclosure may be used in a multi-stream aggregation MSA system.

In this embodiment of the present disclosure, the pico base station establishes only one RRC entity that is used to generate a configuration parameter.

Figure 4:
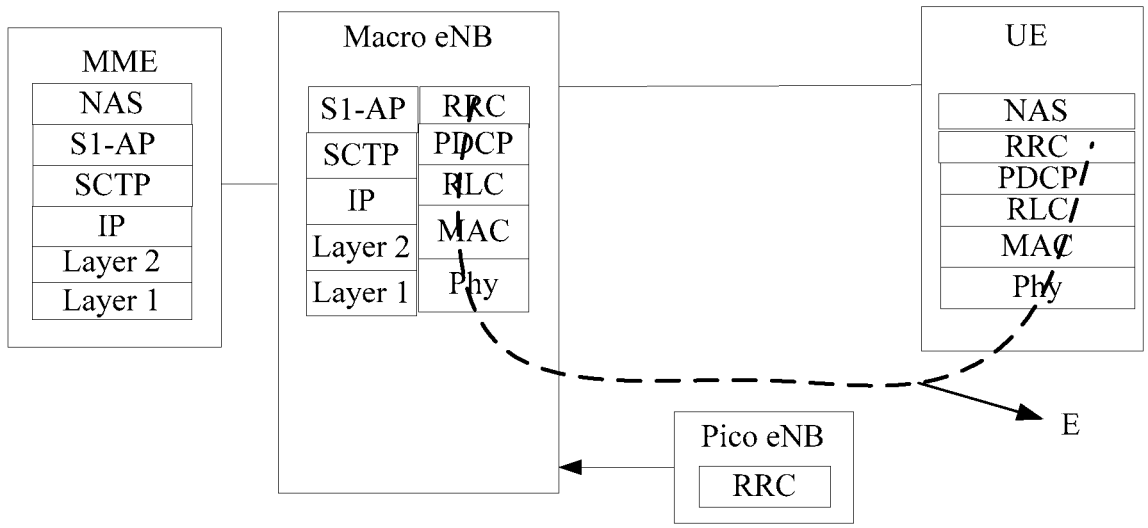
FIG. 4 is a schematic diagram of an RRC protocol stack architecture that is corresponding to a method for sending RRC signaling according to an embodiment of the present disclosure.

In this embodiment of the present disclosure, a Pico eNB establishes only one RRC entity, where the RRC entity determines a related configuration parameter at a bottom layer, and the RRC entity of the Pico eNB and an RRC entity of a Macro eNB jointly generate an RRC reconfiguration message, where the RRC reconfiguration message is sent by the Macro eNB to a UE. Referring to FIG. 4, a dashed line E in FIG. 4 shows that a Macro eNB communicates with a UE.

Figure 5:
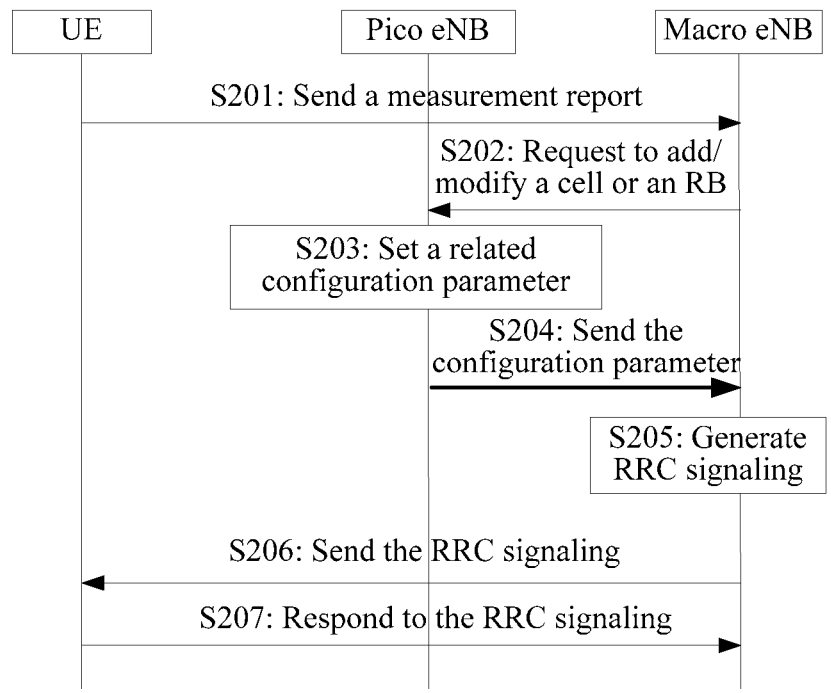
FIG. 5 is a flowchart of another method for sending RRC signaling according to an embodiment of the present disclosure.

When a release of a Pico eNB is earlier than a release of a Macro eNB, for an interaction process between the Pico eNB and the Macro eNB, further refer to FIG. 5, where the process includes the following steps:

S201: A user equipment sends a measurement report to a Macro eNB.

The measurement report includes a signal feature of a neighboring cell of the UE, such as a pico base station with a strongest signal.

S202: The Macro eNB sends, according to the measurement report, a message for requesting to add/modify a cell or a radio bearer RB to a Pico eNB.

S203: The Pico eNB sets a related configuration parameter.

S204: The Pico eNB sends the set configuration parameter to the Macro eNB.

S205: The Macro eNB generates RRC signaling according to the received configuration parameter.

S206: The Macro eNB sends the RRC signaling to the UE.

S207: The user equipment responds to the RRC signaling.

Figure 6:
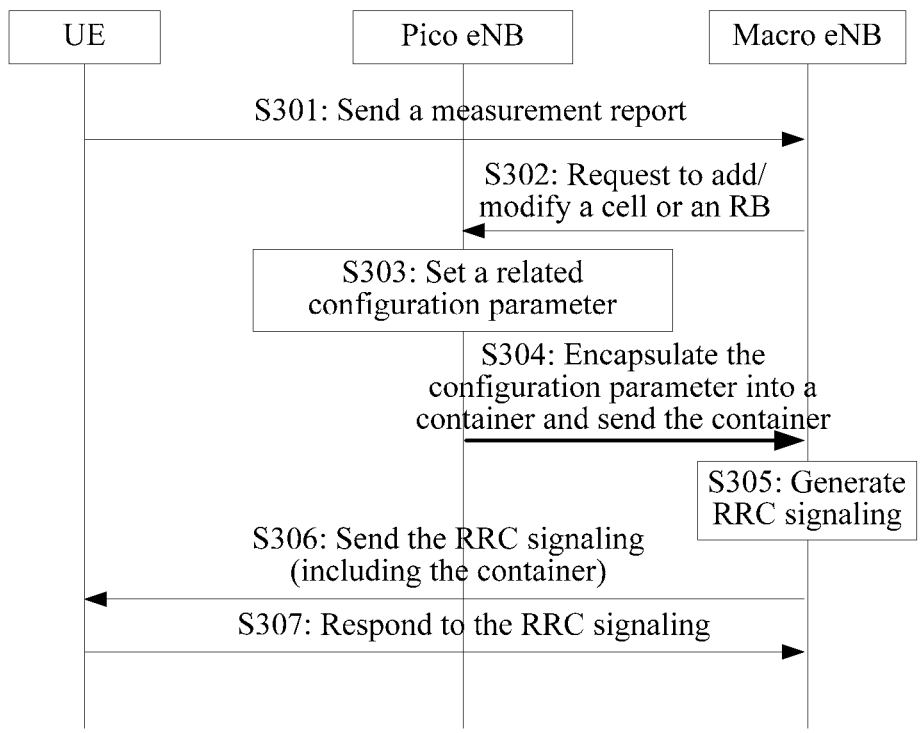
FIG. 6 is a flowchart of another method for sending RRC signaling according to an embodiment of the present disclosure.

When a release of a Pico eNB is later than a release of a Macro eNB, because the release of the Pico eNB is later, the Macro eNB cannot identify a configuration parameter from the Pico eNB, and the Pico eNB needs to encapsulate the configuration parameter into a container. For an interaction process between the Pico eNB and the Macro eNB, further refer to FIG. 6, where the process includes the following steps:

S301: A user equipment sends a measurement report to a Macro eNB.

S302: The Macro eNB sends, according to the measurement report, a message for requesting to add/modify a cell or a radio bearer RB to a Pico eNB.

S303: The Pico eNB sets a related configuration parameter and encapsulates the related configuration parameter into a container.

S304: The Pico eNB sends the configuration parameter encapsulated into the container to the Macro eNB.

S305: The Macro eNB responds to the received container and generates RRC signaling.

S306: The Macro eNB sends the RRC signaling to the UE, where the RRC signaling includes the container.

S307: The UE responds to the RRC signaling.

It can be learned from the foregoing that, in a method for sending RRC signaling provided in this embodiment of the present disclosure, a pico base station establishes only one RRC entity; the pico base station responds to an X2 interface message sent by a macro base station, generates a configuration parameter, and sends the configuration parameter to the macro base station; and the macro base station generates an RRC reconfiguration message according to the configuration parameter and sends the RRC reconfiguration message to a UE. Therefore, the user equipment UE can support, only by establishing an SRB corresponding to the macro base station, parameter configuration that is set by the pico base station and is corresponding to the RRC reconfiguration message, thereby lowering system design complexity and costs.

Figure 7:
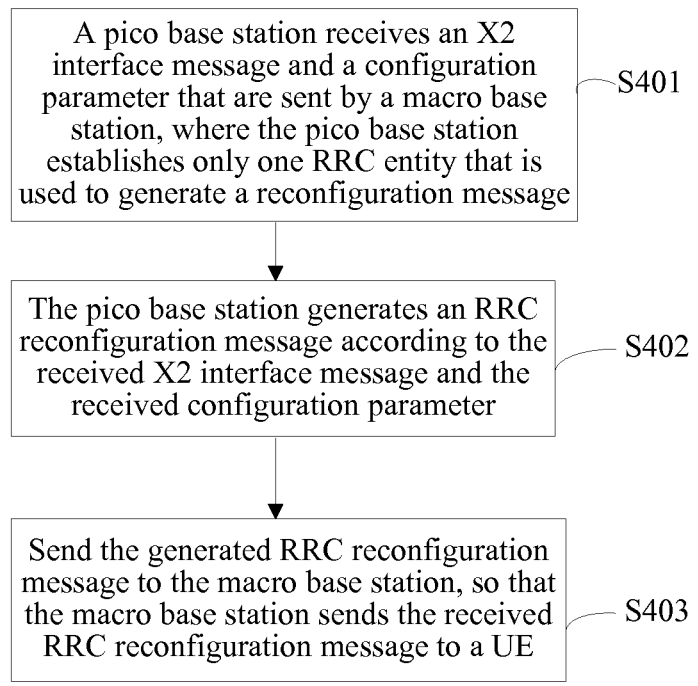
FIG. 7 is a flowchart of another method for sending RRC signaling according to an embodiment of the present disclosure.

An embodiment of the present disclosure further provides a method for sending RRC signaling, and as shown in FIG. 7, the method includes the following steps:

S401: A pico base station receives an X2 interface message and a configuration parameter that are sent by a macro base station, where the X2 interface message includes a message for requesting to add/modify a cell, or a message for requesting to add/modify a radio bearer RB, and the pico base station establishes only one RRC entity that is used to generate an RRC reconfiguration message.

S402: The pico base station generates an RRC reconfiguration message according to the received X2 interface message and the received configuration parameter.

S403: Send the generated RRC reconfiguration message to the macro base station, so that the macro base station sends the received RRC reconfiguration message to a UE.

It can be learned from the foregoing that, in a method for sending RRC signaling provided in this embodiment of the present disclosure, a pico base station establishes only one RRC entity; the pico base station generates an RRC reconfiguration message according to an X2 interface message and a configuration parameter that are received from a macro base station; and the macro base station sends the RRC reconfiguration message to a UE. Therefore, the user equipment UE can support, only by establishing an SRB for communicating with the macro base station, an RRC reconfiguration message sent by the pico base station, thereby lowering design complexity and costs.

An embodiment of the present disclosure further provides a method for sending RRC signaling, where the method includes the following steps:

The macro base station sends an X2 interface message to the pico base station, where the X2 interface message includes a message for requesting to add/modify a cell, or a message for requesting to add/modify a radio bearer RB, so that the pico base station responds to the received X2 interface message, generates a configuration parameter, and sends the generated configuration parameter to the macro base station; and the macro base station generates an RRC reconfiguration message according to the received configuration parameter, and sends the RRC reconfiguration message to a UE.

It can be learned from the foregoing that, in a method for sending RRC signaling provided in this embodiment of the present disclosure, a pico base station establishes only one RRC entity; a macro base station sends an X2 interface message to the pico base station; the pico base station responds to the X2 interface message, generates a configuration parameter, and sends the configuration parameter to the macro base station; and the macro base station generates an RRC reconfiguration message according to the configuration parameter, and sends the RRC reconfiguration message to a UE. Therefore, the user equipment UE can support, only by establishing an SRB for communicating with the macro base station, a configuration parameter that is set by the pico base station and is related to the RRC reconfiguration message, thereby lowering design complexity and costs.

An embodiment of the present disclosure further provides a method for sending RRC signaling, where the method includes the following steps:

The macro base station sends an X2 interface message to the pico base station, where the X2 interface message includes a message for requesting to add/modify a cell, or a message for requesting to add/modify a radio bearer RB, so that the pico base station responds to the received X2 interface message, generates a configuration parameter, encapsulates the generated configuration parameter into a container, and sends the container to the macro base station; and the macro base station generates an RRC reconfiguration message after receiving the container, and sends the generated RRC reconfiguration message to a UE, where the generated RRC reconfiguration message includes the container.

It should be noted that, the method for sending RRC signaling provided in this embodiment of the present disclosure may be applied to a scenario in which a release of the pico base station is later than a release of the macro base station.

It can be learned from the foregoing that, in a method for sending RRC signaling provided in this embodiment of the present disclosure, a pico base station establishes only one RRC entity; a macro base station sends an X2 interface message to the pico base station; the pico base station responds to the X2 interface message, generates a configuration parameter, encapsulates the configuration parameter into a container, and sends the container to the macro base station; and the macro base station responds to the container, generates an RRC reconfiguration message, and sends the RRC reconfiguration message to a UE, where the RRC reconfiguration message includes the container. Therefore, the user equipment UE can support, only by establishing an SRB for communicating with the macro base station, a configuration parameter that is set by the pico base station and is related to the RRC reconfiguration message, thereby lowering design complexity and costs.

An embodiment of the present disclosure further provides a method for sending RRC signaling, where the method includes the following steps:

The macro base station sends an X2 interface message and a configuration parameter to the pico base station, where the X2 interface message includes a message for requesting to add/modify a cell, or a message for requesting to add/modify a radio bearer RB, so that the pico base station generates an RRC reconfiguration message according to the received X2 interface message and the received configuration parameter, and sends the RRC reconfiguration message to the macro base station; and the macro base station sends the received RRC reconfiguration message to a UE.

It can be learned from the foregoing that, in a method for sending RRC signaling provided in this embodiment of the present disclosure, a pico base station establishes only one RRC entity; a macro base station sends an X2 interface message and a configuration parameter to the pico base station; and the pico base station generates an RRC reconfiguration message according to the X2 interface message and the configuration parameter, and the macro base station sends the RRC reconfiguration message to a UE. Therefore, the user equipment UE can support, only by establishing an SRB for communicating with the macro base station, an RRC reconfiguration message sent by the pico base station, thereby lowering design complexity and costs.

Figure 8:
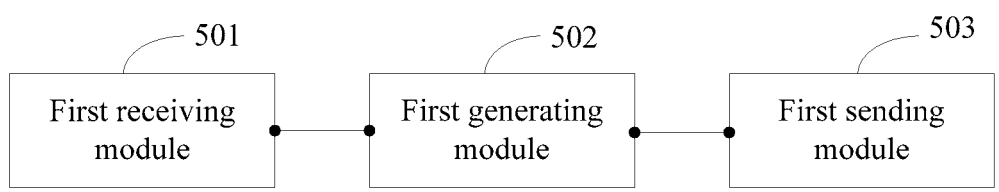
FIG. 8 is a schematic structural diagram of a base station for sending RRC signaling according to an embodiment of the present disclosure.

An embodiment of the present disclosure further provides a base station, and as shown in FIG. 8, the base station includes a first receiving module 501, a first generating module 502, and a first sending module 503.

The first receiving module 501 is configured to receive an X2 interface message sent by a macro base station, where the X2 interface message includes a message for requesting to add/modify a cell, or a message for requesting to add/modify a radio bearer RB;

the first generating module 502 is configured to respond to the X2 interface message received by the first receiving module 501, and generate a configuration parameter; and the first sending module 503 is configured to send the configuration parameter generated by the first generating module 502 to the macro base station, so that the macro base station generates an RRC reconfiguration message according to the received configuration parameter, and sends the RRC reconfiguration message to a UE;

or, the first receiving module 501 is configured to receive an X2 interface message sent by a macro base station, where the X2 interface message includes a message for requesting to add/modify a cell, or a message for requesting to add/modify a radio bearer RB;

the first generating module 502 is configured to respond to the X2 interface message received by the first receiving module 501, and generate a configuration parameter; and the first sending module 503 is configured to encapsulate the configuration parameter generated by the first generating module 502 into a container, and send the container to the macro base station, so that the macro base station generates an RRC reconfiguration message after receiving the container, and sends the RRC reconfiguration message to the UE, where the RRC reconfiguration message includes the container;

or, the first receiving module 501 is configured to receive an X2 interface message and a configuration parameter that are sent by a macro base station, where the X2 interface message includes a message for requesting to add/modify a cell, or a message for requesting to add/modify a radio bearer RB;

the first generating module 502 is configured to generate an RRC reconfiguration message according to the X2 interface message and the configuration parameter that are received by the first receiving module 501; and the first sending module 503 is configured to send the RRC reconfiguration message generated by the first generating module 502 to the macro base station, so that the macro base station sends the received RRC reconfiguration message to a UE.

It can be learned from the foregoing that, in a base station for sending RRC signaling provided in this embodiment of the present disclosure, only one RRC entity is established; a first generating module 502 of the base station generates a configuration parameter according to an X2 interface message received by a first receiving module 501, so that a macro base station that receives the configuration parameter generates an RRC reconfiguration message, and sends the RRC reconfiguration message to a UE. Alternatively, a first generating module 502 of the base station generates an RRC reconfiguration message according to an X2 interface message and a configuration parameter that are received by a first receiving module 501, and a macro base station sends the RRC reconfiguration message to a UE. Therefore, the user equipment UE can support, only by establishing an SRB for communicating with the macro base station, an RRC reconfiguration message sent by a pico base station, thereby lowering design complexity and costs.

Figure 9:
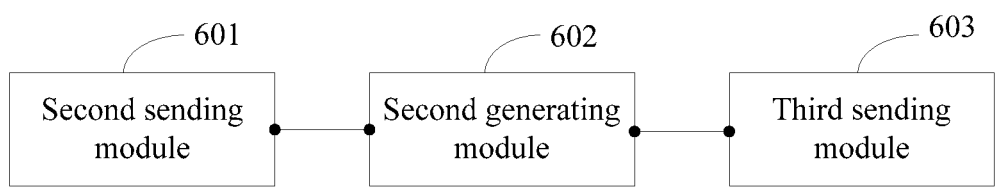
FIG. 9 is a schematic structural diagram of another base station for sending RRC signaling according to an embodiment of the present disclosure.

An embodiment of the present disclosure further provides a base station, and as shown in FIG. 9, the base station includes a second sending module 601, a second generating module 602, and a third sending module 603.

Figure 10:
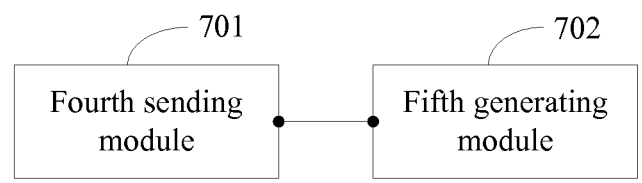
FIG. 10 is a schematic structural diagram of another base station for sending RRC signaling according to an embodiment of the present disclosure.

The second sending module 601 is configured to send an X2 interface message to a pico base station, where the X2 interface message includes a message for requesting to add/modify a cell, or a message for requesting to add/modify a radio bearer RB, so that the pico base station responds to the received X2 interface message, generates a configuration parameter, and sends the generated configuration parameter to the second generating module 602;

the second generating module 602 is configured to generate an RRC reconfiguration message according to the received configuration parameter; and the third sending module 603 is configured to send the RRC reconfiguration message generated by the second generating module 602 to a UE;

or, the second sending module 601 is configured to send an X2 interface message to a pico base station, where the X2 interface message includes a message for requesting to add/modify a cell, or a message for requesting to add/modify a radio bearer RB, so that the pico base station responds to the received X2 interface message, generates a configuration parameter, encapsulates the generated configuration parameter into a container, and sends the container to the second generating module 602;

the second generating module 602 is configured to respond to the received container and generate an RRC reconfiguration message; and the third sending module 603 is configured to send the RRC reconfiguration message generated by the second generating module 602 to a UE, where the RRC reconfiguration message includes the container;

or, as shown in FIG. 10, the base station includes a fourth sending module 701 and a fifth sending module 702, where the fourth sending module 701 is configured to send an X2 interface message and a configuration parameter to a pico base station, where the X2 interface message includes a message for requesting to add/modify a cell, or a message for requesting to add/modify a radio bearer RB, so that the pico base station generates an RRC reconfiguration message according to the received X2 interface message and the received configuration parameter, and sends the RRC reconfiguration message to the fifth sending module 702; and the fifth sending module 702 is configured to send the received RRC reconfiguration message to a UE.

It can be learned from the foregoing that, in a base station for sending RRC signaling provided in this embodiment of the present disclosure, a macro base station sends an X2 interface message, so that a pico base station responds to the X2 interface message, generates a configuration parameter, and sends the configuration parameter to the macro base station; and the macro base station generates an RRC reconfiguration message according to the configuration parameter and sends the RRC reconfiguration message to a UE. Alternatively, a macro base station sends an X2 interface message and a configuration parameter, so that a pico base station generates an RRC reconfiguration message according to the X2 interface message and the configuration parameter, and the macro base station sends the RRC reconfiguration message to a UE. Therefore, the user equipment UE can support, only by establishing an SRB for communicating with the macro base station, an RRC reconfiguration message sent by the pico base station, thereby lowering system design complexity and costs.

Figure 11:
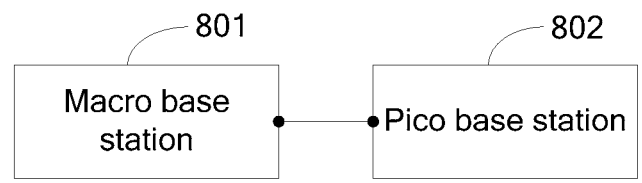
FIG. 11 is a schematic structural diagram of a system for sending RRC signaling according to an embodiment of the present disclosure.

An embodiment of the present disclosure further provides a system for sending RRC signaling, and as shown in FIG. 11, the system includes a macro base station 801 and a pico base station 802.

The macro base station 801 and the pico base station 802 are configured to participate in generation of an RRC reconfiguration message.

The macro base station 801 is further configured to send the generated RRC reconfiguration message to the UE.

The pico base station 802 establishes only one RRC entity that is used to generate a configuration parameter or generate an RRC reconfiguration message.

It can be learned from the foregoing that, in a system for sending RRC signaling provided in this embodiment of the present disclosure, a macro base station 801 and a pico base station 802 participate in generation of an RRC reconfiguration message; the pico base station 802 establishes only one RRC entity that is used to generate a configuration parameter or an RRC reconfiguration message; the RRC reconfiguration message cooperatively generated by the macro base station 801 and the pico base station 802 is uniformly sent by the macro base station 801 to a UE. Therefore, the user equipment UE can support, only by establishing an SRB for communicating with the macro base station 801, RRC signaling sent by the pico base station 802, thereby lowering design complexity and costs.

An embodiment of the present disclosure further provides another system for sending RRC signaling, where the system includes a macro base station and a pico base station.

The pico base station includes a first receiving module, a first generating module, and a first sending module.

The first receiving module is configured to receive an X2 interface message sent by the macro base station, where the X2 interface message includes a message for requesting to add/modify a cell, or a message for requesting to add/modify a radio bearer RB;

the first generating module is configured to respond to the X2 interface message received by the first receiving module, and generate a configuration parameter; and the first sending module is configured to send the configuration parameter generated by the first generating module to the macro base station, so that the macro base station generates an RRC reconfiguration message by using the received configuration parameter, and sends the generated RRC reconfiguration message to a UE;

or, the first receiving module is configured to receive an X2 interface message sent by the macro base station, where the X2 interface message includes a message for requesting to add/modify a cell, or a message for requesting to add/modify a radio bearer RB;

the first generating module is configured to respond to the X2 interface message received by the first receiving module, and generate a configuration parameter; and the first sending module is configured to encapsulate the configuration parameter generated by the first generating module into a container, and send the container to the macro base station, so that the macro base station generates an RRC reconfiguration message after receiving the container, and sends the RRC reconfiguration message to the UE, where the RRC reconfiguration message includes the container;

or, the first receiving module is configured to receive an X2 interface message and a configuration parameter that are sent by the macro base station, where the X2 interface message includes a message for requesting to add/modify a cell, or a message for requesting to add/modify a radio bearer RB;

the first generating module is configured to generate an RRC reconfiguration message according to the X2 interface message and the configuration parameter that are received by the first receiving module; and the first sending module is configured to send the RRC reconfiguration message generated by the first generating module to the macro base station, so that the macro base station sends the received RRC reconfiguration message to a UE.

It can be learned from the foregoing that, a system for sending RRC signaling provided in this embodiment of the present disclosure includes a macro base station and a pico base station; the pico base station responds to an X2 interface message sent by the macro base station, generates a configuration parameter, and sends the configuration parameter to the macro base station, so that the macro base station generates an RRC reconfiguration message according to the configuration parameter, and sends the RRC reconfiguration message to a UE. Alternatively, the pico base station generates an RRC reconfiguration message according to an X2 interface message and a configuration parameter that are sent by the macro base station, and the macro base station sends the RRC reconfiguration message to a UE. Therefore, the user equipment UE can support, only by establishing an SRB for communicating with the macro base station, RRC signaling sent by the pico base station, thereby lowering design complexity and costs.

An embodiment of the present disclosure further provides another system for sending RRC signaling, where the system includes a macro base station and a pico base station.

The macro base station includes:

a second sending module, a second generating module, and a third sending module.

The second sending module is configured to send an X2 interface message to the pico base station, where the X2 interface message includes a message for requesting to add/modify a cell, or a message for requesting to add/modify a radio bearer RB, so that the pico base station responds to the received X2 interface message, generates a configuration parameter, and sends the generated configuration parameter to the second generating module;

the second generating module is configured to generate an RRC reconfiguration message according to the received configuration parameter; and the third sending module is configured to send the RRC reconfiguration message generated by the second generating module to a UE;

or, the second sending module is configured to send an X2 interface message to the pico base station, where the X2 interface message includes a message for requesting to add/modify a cell, or a message for requesting to add/modify a radio bearer RB, so that the pico base station responds to the received X2 interface message, generates a configuration parameter, encapsulates the generated configuration parameter into a container, and sends the container to the second generating module;

the second generating module is configured to respond to the received container and generate an RRC reconfiguration message; and the third sending module is configured to send the RRC reconfiguration message generated by the second generating module to a UE, where the RRC reconfiguration message includes the container;

or, the base station includes a fourth sending module and a fifth sending module, where the fourth sending module is configured to send an X2 interface message and a configuration parameter to the pico base station, where the X2 interface message includes a message for requesting to add/modify a cell, or a message for requesting to add/modify a radio bearer RB, so that the pico base station generates an RRC reconfiguration message according to the received X2 interface message and the received configuration parameter, and sends the generated RRC reconfiguration message to the fifth sending module; and the fifth sending module is configured to send the received RRC reconfiguration message to a UE.

It can be learned from the foregoing that, a system for sending RRC signaling provided in this embodiment of the present disclosure includes a macro base station and a pico base station; the macro base station sends an X2 interface message to the pico base station, so that the pico base station responds to the X2 interface message, generates a configuration parameter, and sends the configuration parameter to the macro base station; and therefore, the macro base station generates an RRC reconfiguration message and sends the RRC reconfiguration message to a UE. Alternatively, the macro base station sends an X2 interface message and a configuration parameter to the pico base station, so that the pico base station generates an RRC reconfiguration message according to the X2 interface message and the configuration parameter, and the macro base station sends the RRC reconfiguration message to a UE. Therefore, the user equipment UE can support, only by establishing an SRB for communicating with the macro base station, an RRC reconfiguration message sent by the pico base station, thereby lowering design complexity and costs.

It should be noted that, in this embodiment of the present disclosure, RRC signaling includes an RRC reconfiguration message.

A person of ordinary skill in the art may understand that all or some of the steps of the methods in the embodiments may be implemented by a program instructing related hardware. The program may be stored in a computer-readable storage medium. The storage medium may include: a read-only memory (ROM, Read-Only Memory), a random access memory (RAM, Random Access Memory), a magnetic disk, or an optical disc.

In addition, in the foregoing embodiments, the description of each embodiment has respective focuses. For a part that is not described in detail in an embodiment, refer to related descriptions in other embodiments.

The foregoing has described a method, a base station, and a system for sending RRC signaling provided in the embodiments of the present disclosure in detail. Several examples are used herein for expounding the principles and implementation manners of the present disclosure. The description of the embodiments is merely intended to help understand the method of the present disclosure and core ideas thereof. In addition, a person skilled in the art can make various modifications and variations to the disclosure with respect to specific implementation manners and application scopes according to the ideas of the disclosure. In conclusion, the content of the specification shall not be construed as a limitation on the present disclosure.

What is claimed is:

1. A method comprising:
   establishing, by a terminal, a signaling radio bearer (SRB) only with a macro base station; and
   receiving, by the terminal, a radio resource control (RRC) reconfiguration message through a RRC entity of a pico base station, a RRC entity of the macro base station, a packet data convergence protocol (PDCP) entity of the macro base station, a radio link control (RLC) entity of the macro base station, a media access control (MAC) entity of the macro base station and a physical layer of the macro base station, wherein the RRC reconfiguration message comprises a configuration parameter of the pico base station.

2. The method according to claim 1, wherein the RRC entity sending the RRC reconfiguration message is the RRC entity of the pico base station.

3. The method according to claim 1, further comprising skipping, by the terminal, establishing a SRB with the pico base station.

4. An apparatus comprising:
   a processor configured to establish a signaling radio bearer (SRB) only with a macro base station; and
   a receiver configured to cooperate with the processor to receive a radio resource control (RRC) reconfiguration message through a RRC entity of a pico base station, a RRC entity of the macro base station, a packet data convergence protocol (PDCP) entity of the macro base station, a radio link control (RLC) entity of the macro base station, a media access control (MAC) entity of the macro base station; and a physical layer of the macro base station, wherein the RRC reconfiguration message includes a configuration parameter of the pico base station.

5. The apparatus according to claim 4, wherein the RRC entity sending the configuration parameter of the RRC entity of the pico base station.

6. The apparatus according to claim 4, wherein the processor is further configured to skip establishing a SRB with the pico base station.

7. An apparatus comprising:
   at least one processor:
   a memory coupled to the at least one processor and storing processor-executable instructions that, when executed by the at least one processor, configure the at least one processor to provide at least the following operations:
      establish a signaling radio bearer (SRB) only with a macro base station; and
      receive a radio resource control (RRC) reconfiguration message through a RRC entity of a pico base station, a RRC entity of the macro base station, a packet data convergence protocol (PDCP) entity of the macro base station, a radio link control (RLC) entity of the macro base station, a media access control (MAC) entity of the macro base station; and a physical layer of the macro base station, wherein the RRC reconfiguration message comprises a configuration parameter of the pico base station.

8. The apparatus according to claim 7, wherein the RRC entity sending the configuration parameter is the RRC entity of the pico base station.

9. The apparatus according to claim 7, wherein the at least one processor is further configured to skip establishing a SRB with the pico base station.

* * * * *